3,749,801
STABILIZED TRANS-DIETHYLSTILBESTROL COMPOSITION AND PROCESS OF MAKING SAME
James J. Brader, Jr., and Richard W. Griscom, Morristown, Tenn., assignors to Chemetron Corporation, Chicago, Ill.
No Drawing. Filed Mar. 1, 1971, Ser. No. 119,928
Int. Cl. A61k 27/00
U.S. Cl. 424—346                                                         11 Claims

ABSTRACT OF THE DISCLOSURE

In an edible vegetable oil environment in which isomerism occurs, diethylstilbestrol is stabilized in the active trans form by the presence of a stabilizing quantity of an acidic phosphorus compound.

BACKGROUND OF THE INVENTION

Diethylstilbestrol (DES) is a hormonal substance which may be represented in the trans isomeric configuration by the formula:

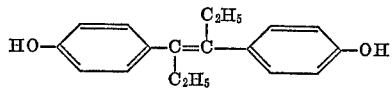

When administered to animals, particularly cattle and sheep, it promotes their growth and increases the efficiency with which they convert feed into protein. Administration may be accomplished in various ways, one of the more popular being by the oral route wherein carefully determined quantities are administered as a feed supplement in admixture with the animal's regular ration. Alternatively, administration may be by means of an implant which is placed within the animal's body and releases hormone at a controlled rate to provide an adequate dose.

In the course of administering the hormone as a feed supplement, commercial practice includes the preparation of a feed additive in which the pure drug is mixed with a liquid or solid substrate to provide a drug concentrate. The concentrate is distributed in a liquid or solid carrier and sold as a premix. The premix may remain in the channels of trade for several weeks, or even months, before incorporation into a ration which is supplied to an animal. During this period when the premix is being distributed from the manufacturer to the feed lot operator, undesirable loss of hormone activity can occur, the extent of the loss being dependent on the nature of the particular environment. The composition of the substrate and the carrier, the time, the temperature and other variables are influencing factors.

Loss of activity may be due to chemical reaction, by which the composition of the diethylsilbestrol molecule is altered, or by a change in molecular geometry, that is, by isomerization. A change in molecular composition may be determined by spectrophotometric analysis according to techniques known to those skilled in the art. Determination of isomeric configuration may be effected by other instrumental methods.

According to one procedure for establishing the ratio of the isomers the diethylstilbestrol is extracted from its environment with diethyl ether, which extracting solvent does not disturb the trans-cis relationship then existing. The ether extract is dried and converted to a trimethylsilyl ether with trimethylchlorosilane which fixes and stabilizes the trans-cis relationship. The diethylstilbestrol silyl derivatives thus obtained are separated and identified by gas-liquid chromatography techniques. The cis isomer has a lower boiling point and elutes first; it is followed by the trans diethylstilbestrol trimethylsilyl ether. A ratio of the quantities of trans and cis isomers can be obtained by computation from the areas of the peaks. The GLC chromatograms may also show peaks other than cis and trans diethylstilbestrol. In the chromatogram of the trisilyl ethers, the cis-pseudo diethylstilbestrol peak, when present, appears between the cis and trans diethylstilbestrol peaks. The trans-pseudo diethylstilbestrol, when present, appears in the tail of the trans diethylstilbestrol peak. The total diethylstilbestrol present in the various premixes can be determined quantitatively by measurement of total peak area.

Diethylstilbestrol is generally considered to be stable (R. C. Wornick, Feedstuffs, Nov. 30, 1968, pages 25, 31) but investigators who worked with dilute aqueous solutions, that is, those containing one to one hundred micrograms per milliliter, reported a loss of activity during storage for several weeks. Smaller losses were reported for more concentrated solutions. It was concluded that the instability was due in part to oxidation and the addition of quantity of hydroquinone equal to or greater than the amount of diethylstilbestrol achieved some stabilization, but only after about 50% of the hormonal activity had been lost. Oily solutions which retained 87% of their activity after thirty-two weeks were considered stable (Smith and Williams, J. Endocrinology 5, 152–157 (1947)).

Quite apart from the degradation of diethylstilbestrol by oxidation, it now appears that loss of activity may occur at the centrations of diethylstilbestrol employed in feed premixes and that isomerization is involved. It is reported (Walton and Brownlee, Nature 151, 305 (1943)) that the trans form possesses enhanced hormonal activity. Fortunately, the pure drug is readily obtained as the trans form and the concentrated pure drug appears not to isomerize. Recently, however, it has been learned that in some admixtures, the diethylstilbestrol assumes the inactive cis configuration to a measurable extent. The rate and degree of this transformation is affected by hormone concentration and the nature of the substrate or solvent, each environment seeming to establish a characteristic trans-cis ratio.

There remains, therefore, a need for a composition and method which will provide a more stable form of the active trans isomer of diethylstilbestrol. Desirably the stabilized composition would be useful as a source of hormone for administration as a food supplement and the like.

THE INVENTION

This invention relates to a liquid animal feed supplement. More particularly, it relates to liquid feed supplement containing an edible vegetable oil and diethylstilbestrol stabilized in the trans isomeric form for an extended period of time.

This invention is based in part upon the discovery that a stabilizing quantity of an acidic phosphorus compound dissolved in vegetable oil, stabilizes diethylstilbestrol (DES) in the active trans isomer form. Vegetable oils useful in animal feeds include soybean oil, corn oil, peanut oil and cottonseed oil, suitably refined.

As used herein the term diethylstilbestrol (DES) is intended to include diethylstilbestrol and its derivatives, especially organic esters such as the propionate, palmitate and esters with mineral acids such as phosphoric and sulfuric. The diethylstilbestrol may amount to from about one percent to about twenty percent by the weight of the total composition and in a preferred embodiment comprises from about two percent to about nine percent by weight.

The acidic phosphorus compound is associated with the trans diethylstilbestrol in a stabilizing quantity and accompanies the diethylstilbestrol in a food concentrate, premix or formulated feed. It may also accompany the drug when it is administered by other suitable route. Effective phosphorus compounds include orthophosphoric acid and its non-toxic acid salts. Also included are the lower acids of phosphorus, for example, hypophosphorus acid, phosphorous acid, pyrophosphorous acid, hypophosphoric acid and the non-toxic acid salts of the phosphorus lower acids. Single compounds or mixtures of phosphorus compounds may be used.

The phosphorus compound is present in a stabilizing quantity. Diethylstilbestrol is stabilized for a relatively short time by about 0.25% by weight of orthophosphoric acid and for periods of increasing length by larger quantities up to about 2% by weight, the amount which saturates the oil with respect to the solubility of the phosphorus compound. Amounts greater than 2% by weight of the composition may be employed without harmful effect.

The oil base liquid premix is added to animal feed and thoroughly mixed to provide a quantity of diethylstilbestrol which may amount to from about 0.4 mg. per pound of feed (0.00009%) or somewhat less to about 20 mg. per pound of feed (0.0044%) or more.

The following examples which are not intended to be limiting, illustrate compositions within the scope of this invention.

Example I

A premix concentrate is prepared by thoroughly mixing 1.8 grams of orthophosphoric acid with 96 grams of refined soybean oil to form a two-phase mixture. To this mixture is added 2.2 grams of trans diethylstilbestrol. The composition is allowed to stand and the supernatant liquid is analyzed at once by gas-liquid chromatographic methods for trans isomer content and at intervals of several days thereafter during storage at ambient temperature. Both trans and cis isomers are determined from the ratio of chromatograph peaks. No other peaks of DES (e.g. oxidation products) are found. Results obtained are shown in Table I Analysis of a similar premix containing no stabilizer is shown for reference. Another sample is prepared in which anhydrous monosodiumphosphate is substituted for the orthophosphoric acid and a slurry prepared. After the DES is added, the supernatant oil phase is analyzed as above. The results also are shown in Table I. Potassium, ammonium and other non-toxic salts may be substituted for the sodium salt.

TABLE I.—STABILIZATION OF TRANS-DIETHYLSTILBESTROL WITH PHOSPHORIC ACID OR ITS ACID SALTS

Trans-diethylstilbestrol dissolved in soybean oil

| Stabilizer (wt. percent) | Percent DES | Age of mixture (days) | Trans isomer content, percent | Cis isomer content, percent |
|---|---|---|---|---|
| None | 4.6 | 0 | 82.7 | 17.3 |
| $H_3PO_4$ (1.8%) | 2.2 | 0 | 100.0 | 0 |
|  |  | 7 | 100.0 | 0 |
|  |  | 60 | 100.0 | 0 |
|  |  | 127 | 99.8 | 0.2 |
|  |  | 200 | 96.2 | 3.8 |
| $NaH_2PO_4$ (2.0%) | 2.2 | 0 | 98.3 | 1.7 |
|  |  | 2 | 97.0 | 3.0 |
|  |  | 39 | 86.4 | 13.4 |

It is apparent that without a stabilizer the trans diethylstilbestrol isomerizes immediately. The result is apparently an equilibrium product with about 17% cis isomer. The phosphate stabilizing compounds clearly inhibit this isomerization.

Example II

Premix concentrates were prepared containing smaller quantities of phosphoric acid than those used in Example I. Orthophosphoric acid in amounts of 0.25 gram, 0.5 gram and 0.9 gram were thoroughly mixed with appropriate quantities of refined soybean oil to give 97.8 grams of oil-stabilizer mixtures. To each of the three mixtures was added 2.2 grams of trans diethylstilbestrol. The premix concentrates were allowed to stand at room temperature and analyzed at intervals for isomer content. The results are shown in Table II.

TABLE II.—STABILIZATION OF 2.2% DES IN SOYBEAN OIL WITH DIFFERENT LEVELS OF PHOSPHORIC ACID

| Percent by weight $H_3PO_4$ | Age of mixture (days) | Trans isomer content, percent | Cis isomer content, percent |
|---|---|---|---|
| 0.9 | 7 | 100.0 | 0 |
|  | 99 | 94.9 | 5.1 |
| 0.5 | 1 | 100.0 | 0 |
|  | 81 | 88.5 | 11.5 |
| 0.25 | 16 | 89.8 | 10.2 |

It is apparent that $H_3PO_4$ even when present in a very small quantity, exerts an influence to maintain DES in its trans isomer form. Larger amounts stabilize the trans DES for longer periods.

Without further explanation it is believed one skilled in the art, from the foregoing description and examples is enabled to use the invention to its fullest extent.

We claim:

1. A composition comprising diethylstilbestrol in its trans isomer form and an edible vegetable oil having dissolved therein an acidic phosphorus compound selected from the class consisting of orthophosphoric acid, hypophosphorous acid, phosphorous acid, pyrophosphorous acid, hypophosphoric acid, the non-toxic acid salts thereof, and mixtures thereof in an amount sufficient to stabilize the diethylstilbestrol in the trans isomer form.

2. A composition according to claim 1 wherein said phosphorus compound is selected from the group consisting of phosphoric acid, the lower acids of phosphorus and the non-toxic salts of said acids and mixtures thereof.

3. A composition according to claim 1 wherein the quantity of phosphorus compound is from about 0.25% to about 2% by weight.

4. A composition according to claim 1 wherein the quantity of phosphorus compound is at least equal to the amount required to provide a saturated solution of said compound in said oil.

5. A composition according to claim 1 wherein the quantity of phosphorus compound exceeds the amount soluble in said oil.

6. A composition according to claim 1 wherein the amount of diethylstilbestrol is from about one to about twenty percent by weight of the total composition.

7. A composition according to claim 1 wherein the amount of diethylstilbestrol is from about two to about nine percent by weight of the total composition.

8. A composition according to claim 1 wherein the amount of the phosphorus compound is from about 0.5% to about two percent by weight of the total composition.

9. A composition according to claim 1 wherein the oil is soybean oil and the amount of phosphorus compound is about two percent by weight of the total composition.

10. A composition according to claim 1 wherein the oil is selected from the group consisting of soybean oil, corn oil, peanut oil and cottonseed oil.

11. The method of making a feed supplement composition which comprises the steps of mixing an acidic phosphorus compound selected from the class consisting of orthophosphoric acid, hypophosphorous acid, phosphorous acid, pyrophosphorous acid, hypophosphoric acid, the non-toxic acid salts thereof, and mixtures thereof with an edible vegetable oil and then adding trans-diethylstilbestrol in an amount from about one to about twenty percent by weight.

References Cited

UNITED STATES PATENTS 3,042,525  7/1962  Mattox _____ 424—346
3,666,865  5/1972  Ludwig _____ 424—346

SAM ROSEN, Primary Examiner

UNITED STATES PATENT OFFICE
CERTIFICATE OF CORRECTION

Patent No. 3,749,801            Dated July 31, 1973

Inventor(s) James J. Brader et al.

It is certified that error appears in the above-identified patent and that said Letters Patent are hereby corrected as shown below:

Column 2, line 29, "centrations" should be -- concentrations -- .

Column 3, line 40, insert a period (.) after "Table 1".

Column 4, lines 71-73, under "References Cited" the notation should be -- NONE -- .

Signed and sealed this 1st day of January 1974.

(SEAL)
Attest:

EDWARD M. FLETCHER, JR.
Attesting Officer

RENE D. TEGTMEYER
Acting Commissioner of Patents